Nov. 17, 1964  R. H. GARRETT ETAL  3,157,191
ROTATING CYLINDER GUIDED CHECK-VALVE ASSEMBLY
Filed April 21, 1961  2 Sheets-Sheet 1

INVENTORS
*RICHARD H. GARRETT*
*GUSTAV M. O'KEIFF*
BY John Gibson Semmes
ATTORNEY Nov. 17, 1964   R. H. GARRETT ETAL   3,157,191
ROTATING CYLINDER GUIDED CHECK-VALVE ASSEMBLY
Filed April 21, 1961   2 Sheets-Sheet 2

INVENTOR
RICHARD H. GARRETT
GUSTAV M. O'KEIFF
BY John Gibson Semmes
ATTORNEY

United States Patent Office 3,157,191
Patented Nov. 17, 1964

3,157,191
ROTATING CYLINDER GUIDED CHECK-VALVE ASSEMBLY
Richard H. Garrett and Gustav M. O'Keiff, Houston, Tex., assignors to Dixell Development and Manufacturing Company, Houston, Tex., a corporation of Texas
Filed Apr. 21, 1961, Ser. No. 104,722
4 Claims. (Cl. 137—332)

The present invention relates to valve constructions and more especially to positive displacement fluid valves used in association with well pumps and the like.

In the construction of fluid valves, applicable to pump heads for instance, various problems occur with respect to efficiency in operation, considering the inter-relation between static and moving parts. These include wear characteristics of the correlative elements; the ability to achieve valve rotation irrespective of frictional forces such as are developed between guide and valve head in high pressure fluid transfer; the means of operably securing compression forces on valve body, irrespective of continuous rotational movement thereof; the desire to obtain increased fluid output, irrespective of size of component valve body and guide parts and of the restrictions as to reciprocating travel of the valve. These and other problems inherent in the use of prior art devices are met and overcome by the present invention in which a combination of static and moving components results in increased operating efficiency and wear characteristics. The valves described herein are somewhat similar to those described in application Serial No. 758,317, filed September 2, 1958, and now abandoned.

It is the cardinal object of the invention to provide a reciprocating valve system wherein the valve in operation is positively guided to and from the seat thereof, thus insuring a smooth valve action, eliminating thereby destructive pressure surges, which are known to cause packing gland failures, particularly in the suction side of a pump associated with valves.

It is also an important object of the invention to provide a reciprocating valve body having a depending tubular means to stabilize reciprocating movements of the valve, the tubular means receiving fluid under pressure, initially in a direct line with sliding movements of the valve body, effecting opening of the valve, the body further having a plurality of angularly disposed vanes and complemental discharge ports in the upper portion of the cylinder to effect rotary movement of the valve body irrespective of opposing frictional forces.

The objects of invention moreover include in valve construction of the positive displacement type, a combination which insures continuous cleaning of the valve seat, whereby the valve per se may, upon reduction in pressure, reposition itself to close uniformly in sealing relation to the seat, irrespective of wear upon opposed valving surfaces.

A further objective of invention resides in creating a means within compression valve constructions for insuring rotation of the valve per se while yielding a maximum flow of fluid under pressure, irrespective of limitations as to travel of the valve. These and other objectives of invention are recited in the ensuing detailed description and claims.

Figure 1:
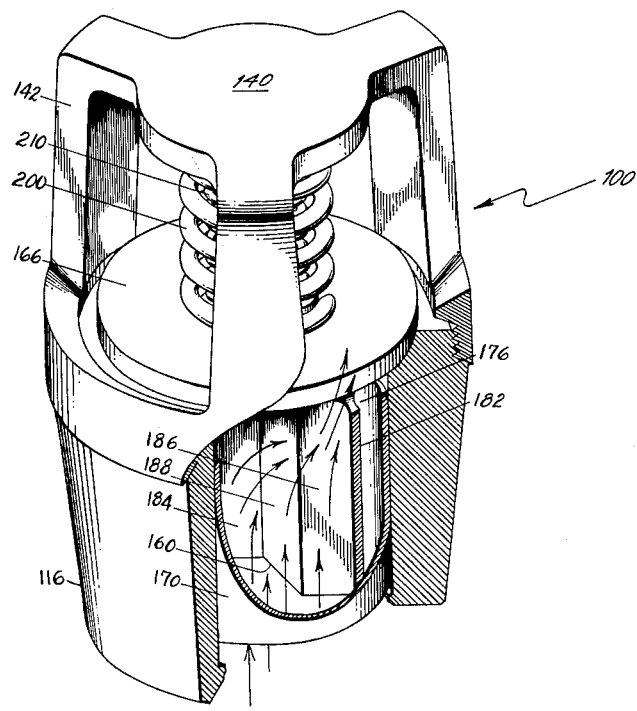
FIG. 1 is a view of invention in perspective, showing the components thereof completely assembled. Portions of static and moving components are shown in fragment.

Referring to the drawings, the check valve assembly is generally indicated by the numeral 100, the same consisting of the static guide 110 with assembled cage 140 secured atop. Guide 110 includes inlet port 112 and outlet port 114, the latter being defined at its upper extension by the bevelled valve seat 122. The tubular guide 110 has a tapered outer wall 116, its smaller circumference being adjacent its lower end. The guide is provided with a cylindrical inner wall 118, terminating at its lower end to form the peripheral shoulder 120. This circular shoulder is useful as a support for the valve body head 160, should the tubular portion 170 thereof detach from the valve sealing portion 166.

Figure 2:
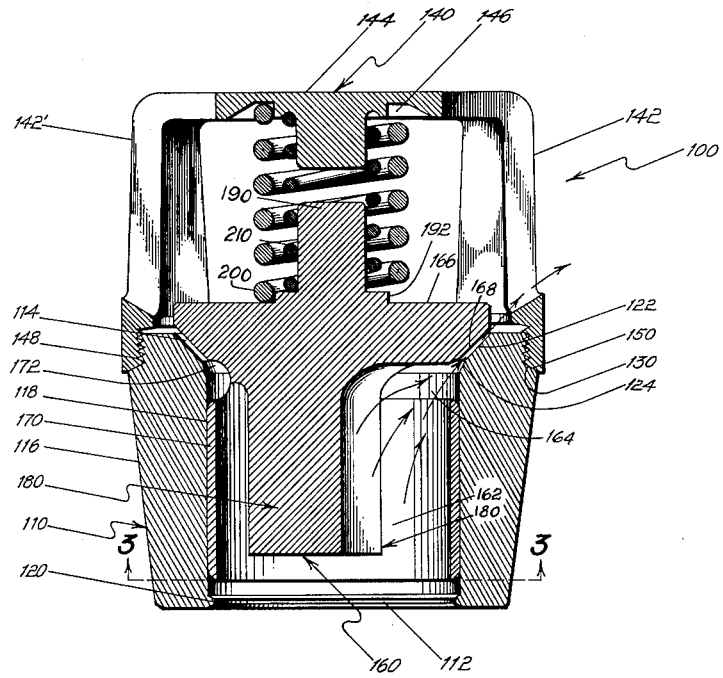
FIG. 2 is a vertical sectional view of invention, showing the operative inter-relation of static and moving components.

At the lower extremity of the valve seat a high pressure operation "relief angle" cut-out 124 is provided which is of a radius slightly greater than the minimum radius of the lower portion of the valve cap or sealing surface 168 (FIG. 2). Thus annular clearance is obtained below the valving surfaces and adjacent their respective lower ends. In practice, the pounding action of the valve has an impact and extruding effect upon the static seat 122, this annular clearance then providing a repository therefor, without interference with the valving action. It will be appreciated that a simple axial counter bore at 124 would, as an equivalent, serve the same useful extrusion containing purpose. The relief angle shown, however, tends to reduce turbulent flow upon opening of the valve and accordingly, the preferred form is shown.

Figure 3:
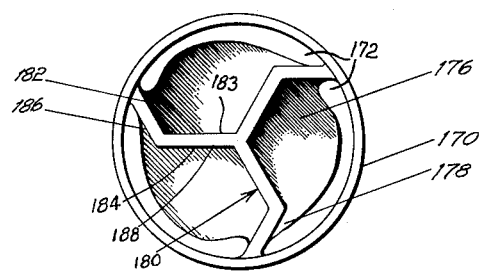
FIG. 3 illustrates details of the valve head, the same being a horizontal sectional view taken along the bottom lines 3—3 of FIG. 2.

The valve 160 includes inlet and outlet portions 162 and 164 respectively, the latter being defined by discharge ports which are communicant with axially disposed chambers, as will appear hereinafter. The valve head 166 includes a bevelled cap 168 complemental with the counterpart seat 122 of static tubular guide 110. The lower portion of the valve includes a cylindrical wall 170, slidably contiguous the interior wall 118 of the stator 110. FIGS. 2 and 3. The respective valve discharge ports 172 are disposed between the top of the cylindrical wall 170 and the bevelled sealing surface 168, the respective discharge ports having configuration complemental to and in tangential disposition with respect to the vanes 180 hereinafter described. For instance, the ports 172 each include a fluid gathering portion 176 and exhaust portion 178. The gathering or collecting portion 176 being concave is adjacent the high pressure area 182 of the respective vanes 180 whereas the exhaust portion being convex is adjacent the respective low pressure portion 186 of the vanes 180. The more heavily shaded portion 176 of the discharge port 172 is of deeper concavity than are the collecting and exhaust portions. As shown, the entire port 172 exhausts, however, its high and low pressure areas are adjacent concave portion 176 and convexed portion 178 respectively.

Vanes 180, which are generally shown in FIG. 3, comprise radially disposed segments and tangentially disposed segments. The front face 182 of the tangentially disposed segments and the corresponding wall 183 of the radially disposed segment described an obtuse angle and define a high pressure area. The rear face 186 of the tangentially disposed vane segments and the adjacent wall 188 of the corresponding radially disposed segments form a reflex angle and define a low pressure area. Thus, fluid passing under pressure through the valve by reason of the conformation of the gathering roof portion 176 and the vanes, axially produces a substantial high pressure upon the tangential wall 182 and corresponding portion of the discharge port, a lower pressure being thus created on the opposite side 186. This differential in fluid pressure caused by the impinging of fluid upon the vanes, as aforementioned, produces a resultant tangential force on the valve body per se, thus causing rotation of the valve within the seat, in the examples shown, counterclockwise. Obviously, the reverse of design would create clockwise rotational movement to the valve. By design, the specific vanes are adapted to overcome not only the frictional force of the corresponding rotor and stator walls 170 and 118 respectively, but also of compression element friction, against the valve and adjacent the compression seat 192. As shown, the protrusion 190 serves to guide the smaller spring 210 and the seat 192 retains the larger spring 200 against displacement. Cage 140 is provided with stabilizers 142, protrusion 144 and groove 146 each forming guides for the springs. At 148 the cage 140 is appropriately seated to the cylinder 110, as shown.

In actual operation, the valve per se must rise off the seat against the compression of the resilient members and under high pressure the respective guides for the resilient members abut, increasing the friction of static and moving elements (the valve and the cage guides 190 and 144 respectively). As the respective static and moving abutments or positive stops touch, maximum compression is reached, and additionally there occurs a maximum flow upon the vanes, whereupon an abrupt transition in fluid direction is necessary to create the tangential forces sufficient to cause rotation of the valve through the impinging of fluid upon the high pressure areas of the vanes and respective adjacent portions of discharge ports thereof. It will be obvious to those skilled in the art that the vanes might be constructed to have an angle on one side or the other only, whereby a rotating force would result which would be of lesser magnitude than as where the vanes are bent on both sides, as in the present instance.

It is most expedient, where the rotation of the valve is to be counterclockwise, that the cage, which is threaded onto the tubular guide adjacent the seat thereof, be threaded in the same counterclockwise direction of rotation of the valve, whereby the rotating valve, in operation, tends to tighten the thread by torsional forces transmitted through the compression springs. In this same connection, the respective bevelled surfaces of cage and stator at 150 complement a securing of the cage during operation. Also, as will be apparent stability to the rotor valve 160 is enhanced by the respective disposition of the compression springs, especially, the inner spring 210.

Various modifications as to configuration and location of parts may be made without departing from the spirit of invention as defined in the appended claims.

We claim:

1. A fluid check valve comprising a tubular guide having inlet and outlet ends, the outlet end defining a valve seat, a valve head reciprocably mounted in seating relation to the guide, said head defining axial flow chambers and rotational transition flow ports communicant with the chambers of the head, said transition flow ports and flow chambers being bounded respectively by roof and vane each configured to collect at high pressure and to direct discharge at lower pressure from the flow ports, the configuration of the roof and vanes cooperating to effect rotation of the valve head during conditions of fluid flow, and restraining means urging the head into valving registry with the seat of the guide.

2. The valve system according to claim 1 in which the roof configuration comprises concave and convex portions and wherein the vanes are each bent radially along at least one face thereof, the concave portion of the roof being immediately adjacent said one face.

3. The valve system according to claim 1 in which the roof configuration comprises concave and convex portions and wherein the vanes are disposed in spaced relationship, and adjacent vanes define a portion of the respective ports, opposed walls of each vane extending radially and being bent tangentially with respect to the longitudinal axis of the valve head.

4. A fluid check valve comprising a tubular guide having inlet and outlet ends, the outlet end defining a valve seat; a hollow valve head having a wall of circular cross-section, said head likewise having inlet and outlet ends; cap means on the outlet end of the valve head cooperating in valving registry with the valve seat; vanes fixed to said cap and to the interior of said wall, said vanes and said wall forming axial flow chambers: said wall being cut away adjacent the cap forming an exhaust port in each chamber, and means urging said valve head into valving registry with the said valve seat, said vanes being joined at the axis of said head, extending part of the distance from said axis to said wall in a radial direction, being uniformly bent, and extending for the remainder of said distance in a direction between radial and tangential, wherein one face of each vane describes an obtuse angle and the opposite face describes a reflex angle, and wherein the surface of the chamber is concave adjacent the cap and the obtuse angle of said vanes, and convex adjacent the cap and the reflex angle of said vanes.

References Cited in the file of this patent

UNITED STATES PATENTS

| | | |
|---|---|---|
| 50,394 | Shield | Oct. 10, 1865 |
| 286,742 | Stock | Oct. 16, 1883 |
| 370,896 | Schuehle | Oct. 4, 1887 |
| 799,732 | Harsen | Sept. 19, 1905 |
| 1,602,372 | Bullen | Oct. 5, 1926 |
| 1,684,220 | Gibson | Sept. 11, 1928 |
| 2,011,740 | Vallendor | Aug. 20, 1935 |
| 2,640,677 | Craven | June 2, 1953 |
| 2,949,127 | Malina | Aug. 16, 1960 |